(12) United States Patent
Stevenson et al.

(10) Patent No.: US 7,036,644 B2
(45) Date of Patent: May 2, 2006

(54) TORQUE-TRANSMITTING MECHANISM WITH LATCHING APPARATUS

(75) Inventors: Paul D. Stevenson, Ann Arbor, MI (US); Jeffrey J. Biallas, Dexter, MI (US); Clinton E. Carey, Monroe, MI (US)

(73) Assignee: General Motors Corporation, Detroit, MI (US)

( * ) Notice: Subject to any disclaimer, the term of this patent is extended or adjusted under 35 U.S.C. 154(b) by 77 days.

(21) Appl. No.: 10/851,402

(22) Filed: May 21, 2004

(65) Prior Publication Data

US 2005/0258013 A1 Nov. 24, 2005

(51) Int. Cl.
 F16D 13/04 (2006.01)
 F16D 23/12 (2006.01)
(52) U.S. Cl. ............... 192/35; 192/53.5; 192/84.7; 192/114 R
(58) Field of Classification Search ............... 192/92, 192/54.52, 84.7, 53.2, 53.4
 See application file for complete search history.

(56) References Cited

U.S. PATENT DOCUMENTS

| 2,547,732 | A | * | 4/1951 | Baker ................... 192/114 R |
| 3,860,100 | A | * | 1/1975 | Spanke et al. .......... 192/85 CA |
| 5,485,904 | A | * | 1/1996 | Organek et al. ............... 192/35 |
| 5,535,869 | A | * | 7/1996 | Bigley et al. ........... 192/114 R |
| 5,651,437 | A | * | 7/1997 | Organek et al. ............... 192/35 |
| 2005/0205377 | A1 | * | 9/2005 | Borgerson et al. ......... 192/84.7 |

* cited by examiner

Primary Examiner—Rodney H. Bonck
(74) Attorney, Agent, or Firm—Christopher DeVries

(57) ABSTRACT

A torque-transmitting mechanism having a latching apparatus includes a frictional drive connection between two components of a transmission mechanism. The torque-transmitting mechanism is controlled in engagement and disengagement through an apply piston to which an apply component is presented. The latching mechanism will prevent disengagement of the torque-transmitting mechanism even when the apply force is disestablished. The latching mechanism is provided with a controlled release to permit the apply force to be reestablished and thereafter control disengagement of the torque-transmitting mechanism.

6 Claims, 4 Drawing Sheets

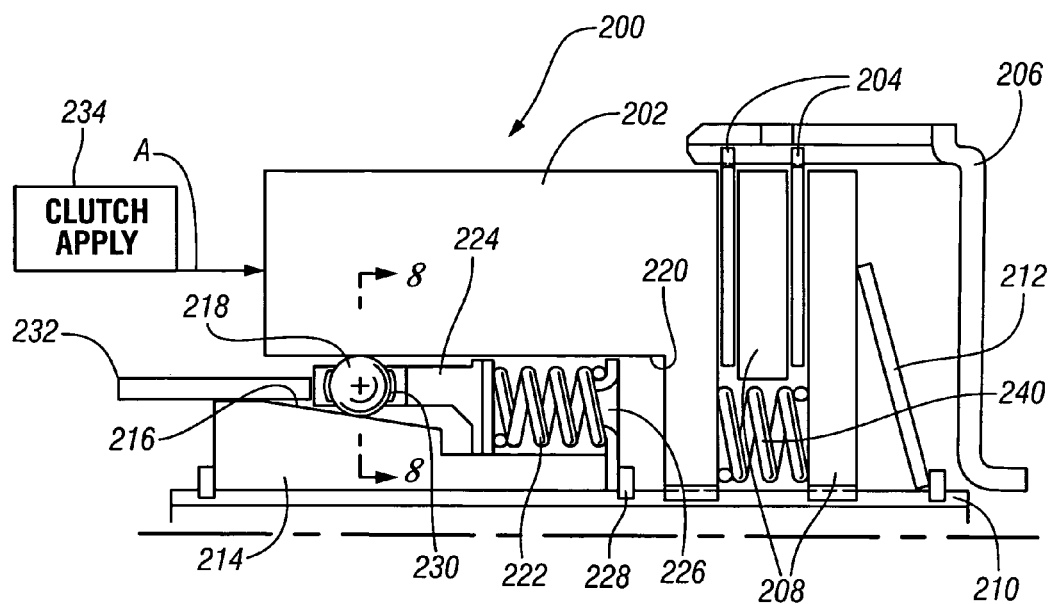
FIG. 7
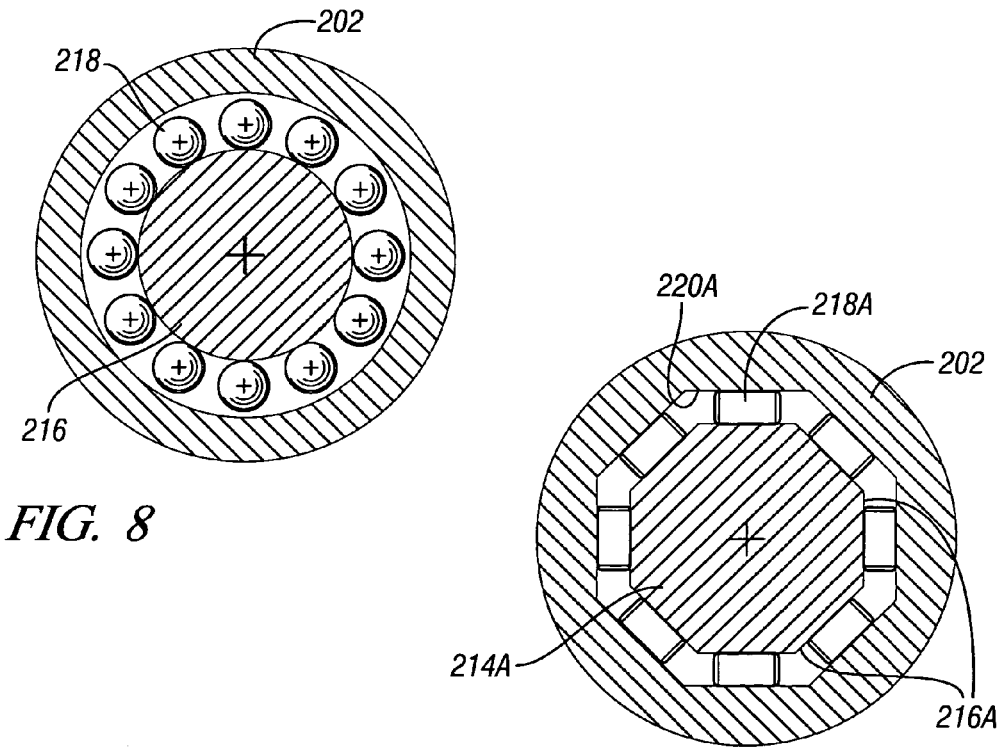
FIG. 8
FIG. 9

TORQUE-TRANSMITTING MECHANISM WITH LATCHING APPARATUS

TECHNICAL FIELD

This invention relates to latching apparatus for torque-transmitting mechanisms.

BACKGROUND OF THE INVENTION

The use or desire to use stationary devices for applying rotating clutch torque-transmitting mechanisms is becoming more popular. These devices are being considered because they permit the use of electric motor apply mechanisms and simpler hydraulic apply mechanisms.

Generally, the electric motor devices also include what is commonly termed a torque-to-thrust apparatus that converts a rotary input to an axial thrust, which in turn provides the required force for torque-transmitting mechanism engagement. The hydraulic apply devices have non-rotating pistons supplying the required force for torque-transmitting mechanism engagement. A thrust bearing is disposed between the non-rotating input mechanism, either hydraulic or electrical, and the apply plate for the torque-transmitting mechanism. While the thrust bearing is capable of transmitting the required apply force, it would be more desirable if the apply force could be reduced or eliminated after the torque-transmitting mechanism is applied to reduce bearing size and eliminate friction loss.

SUMMARY OF THE INVENTION

It is an object of the present invention to provide an improved torque-transmitting mechanism having a latching apparatus.

In one aspect of the present invention, a torque-transmitting mechanism has an apply mechanism which initiates engagement and a torque-to-thrust apparatus which maintains engagement.

In another aspect of the present invention, a torque-to-thrust apparatus is used as part of a latching mechanism, which maintains the application or engagement of the torque-transmitting mechanism while permitting the apply mechanism to be reduced to a minimum value.

In still another aspect of the present invention, a latching mechanism is disposed directly between an apply piston and a relatively stationary component of the torque-transmitting mechanism.

In yet another aspect of the present invention, the latching mechanism incorporates a one-way torque-transmitting mechanism disposed within the latching mechanism.

In yet still another aspect of the present invention, the latching mechanism includes a mechanical torque-transmitting mechanism, which is operable to provide a direct drive connection between two sides of a torque-to-thrust mechanism.

DESCRIPTION OF THE DRAWINGS

FIG. 7 is a partial elevational view of a portion of a torque-transmitting mechanism having another embodiment incorporating the present invention.

FIG. 8 is a view taken along line 8—8 of FIG. 7.

FIG. 9 is an alternative structure similar to that shown in FIG. 8.

DESCRIPTION OF THE EXEMPLARY EMBODIMENTS

Figure 1:
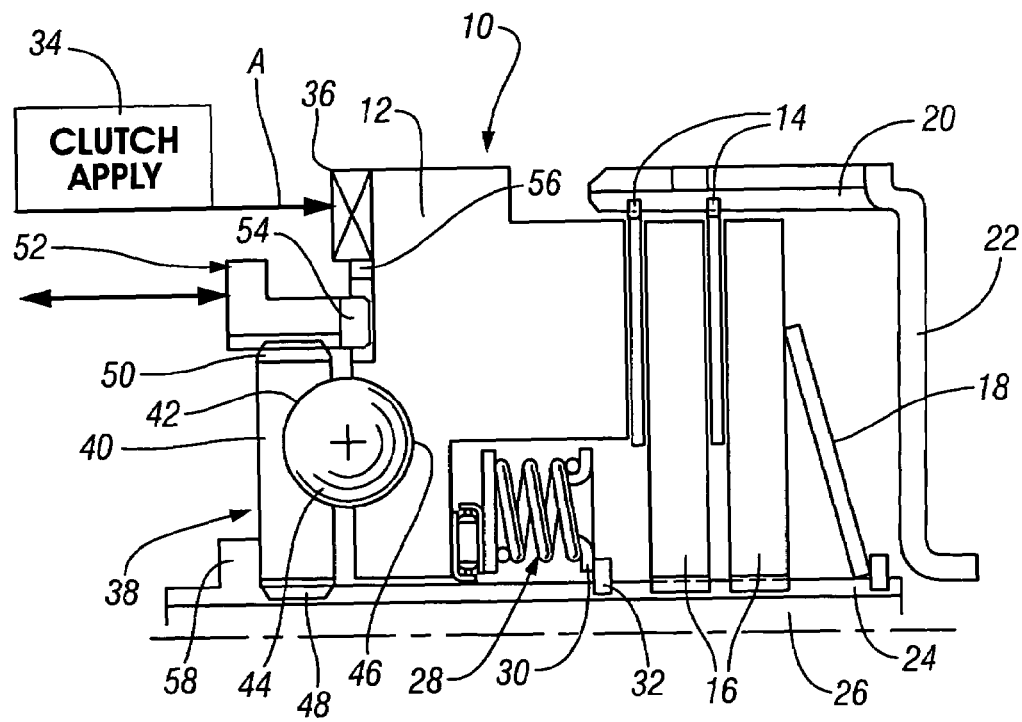
FIG. 1 is a partial elevational view of a torque-transmitting mechanism incorporating the present invention.

Referring to the drawings, wherein like characters represent the same or corresponding parts throughout the several views, there is shown in FIG. 1 a partial view of a torque-transmitting mechanism 10 having an apply plate 12, a first plurality of friction plates 14, a second plurality of friction plates 16, and a compliance spring 18. The friction plates 14 are drivingly connected through a spline 20 with a hub member 22, which in turn is connected with a transmission component, not shown. The plates 16 are drivingly connected through a spline 24 with a shaft 26. A return spring 28 is compressed between a retainer 30 and the apply plate 12. The retainer 30 is positioned on the shaft 26 through a locking or expansion ring 32.

The torque-transmitting mechanism 10 has a clutch apply mechanism 34, which provides a force as shown at Arrow A through a thrust bearing 36 to the apply plate 12. The clutch apply mechanism may consist of either a conventional hydraulic piston arrangement (preferably a non-rotating piston) or an electric motor energizing an additional torque-to-thrust mechanism. The apply plate 12 is also a component in a torque-to-thrust apparatus generally designated 38. The torque-to-thrust apparatus 38 includes a rotary plate 40 having a cam surface 42 formed thereon, a plurality of rollers or spheres 44 disposed in engagement with the cam surface 42, and a cam surface 46 formed on the apply plate 12.

The rotary plate 40 is drivingly connected with the shaft 26 through a spline 48. The apply plate 12 will also rotate with the shaft 26 and the plurality of rollers or spheres 44 of the torque-to-thrust apparatus 38 will be engaged in position by a slight frictional drag between the apply plate 12 and the plate 14. The rotary plate 40 has an outer spline 50 on which is drivingly connected a mechanical clutch 52. The mechanical clutch 52 has an axially extending toothed surface 54 adapted to engage in a complementary toothed surface 56 formed on the plate 12.

When the mechanical clutch 52 is engaged (the position shown), the plate 40 and apply plate 12 rotate in unison. During operation, when the torque-transmitting mechanism 10 is disengaged, the mechanical clutch 52 is also disengaged. To apply the torque-transmitting mechanism 10, an apply force in the direction of Arrow A is established at the clutch apply mechanism 34 through the thrust bearing 36. As the apply plate 12 moves axially and engages the plates 14 and 16, the resulting frictional contact therebetween causes rotation of the apply plate 12 relative to the plate 40, such that the torque-to-thrust apparatus 38 adjusts the relative axial distance between apply plate 12 and plate 40 as the torque-transmitting mechanism 10 is engaged. The plate 40 is prevented from leftward movement on the shaft 26 by a shoulder portion 58.

When the torque-transmitting mechanism 10 is fully engaged, the mechanical clutch 52 is then engaged such that the torque-to-thrust apparatus 38 cannot change relative positions between the plate 40 and the apply piston 12. Thus, the torque-transmitting mechanism 10 is maintained in engagement and the force from the clutch apply mechanism 34 can be released. Compliance spring 18 ensures that as the force from the clutch apply mechanism 34 is released and transfered to torque-to-thrust apparatus 38, apply force does not drop significantly due to deflections within the torque-to-thrust mechanism. The clutch apply mechanism 34 can be a conventional non-rotating hydraulic piston or an electric motor driven torque to thrust apparatus, such as a ball nut actuator, to establish the apply force A at the bearing 36. By reducing or relieving the force A from the bearing 36, the bearing life is improved, bearing frictional losses are significantly reduced and the bearing load level is never greater than that necessary to establish the operation of the torque-transmitting mechanism 10.

Figure 2:
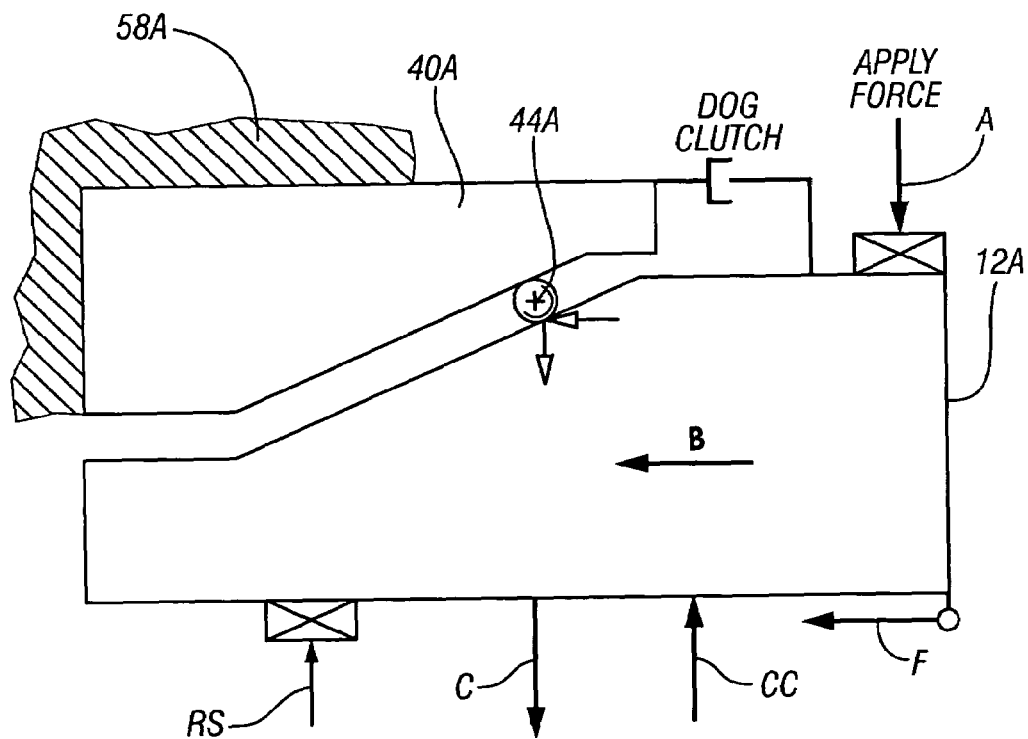
FIG. 2 is a diagrammatic representation of the embodiment shown in FIG. 1.

As seen in FIG. 2, the plate 40A is restricted in movement by the shoulder 58A. The apply force A causes the apply plate 12A to move in the direction of arrow C. The reaction to apply force A also establishes a friction force F, which causes the apply plate 12A to also move in the direction of Arrow B, which maintains contact between spheres 44A between the plate 40A and the apply plate 12A. The movement of the apply plate 12A in the direction of arrow C is resisted by both a return spring force shown at Arrow RS and a force CC representing the compliance spring 18.

To apply the torque-transmitting mechanism 10, an axial force from a nonrotating source is applied to the apply plate 12 through the thrust bearing 36. The friction drag on the clutch plate or friction plate closest to the apply plate 12 creates a friction drag, which causes rotation of the apply plate 12 relative to the plate 40 of the torque-to-thrust apparatus 38 such that the spheres 44 enforce axial travel of the apply plate 12. Once the torque-transmitting mechanism 10 is applied to full engagement, the mechanical clutch 52 is engaged, which latches the torque-to-thrust mechanism in the engaged position and prevents rotational movement between the apply plate 12 and rotary plate 40. After latching, the apply force A is released. As the apply force A is released, the reaction of the engagement load is shifted from the apply force A to the spheres or rollers 44.

With the mechanical clutch 52 fully engaged, relative rotation between the apply plate 12 and rotary plate 40 cannot occur. Since there is no rotational movement, there can be no change in axial positioning and the clamping force on the torque-transmitting mechanism continues. To release or disengage the torque-transmitting mechanism 10, the apply force A is reapplied to its maximum load. This will unload the mechanical clutch 52 and permit disengagement thereof. The apply force A is then decreased in a controlled manner as desired.

Figure 3:
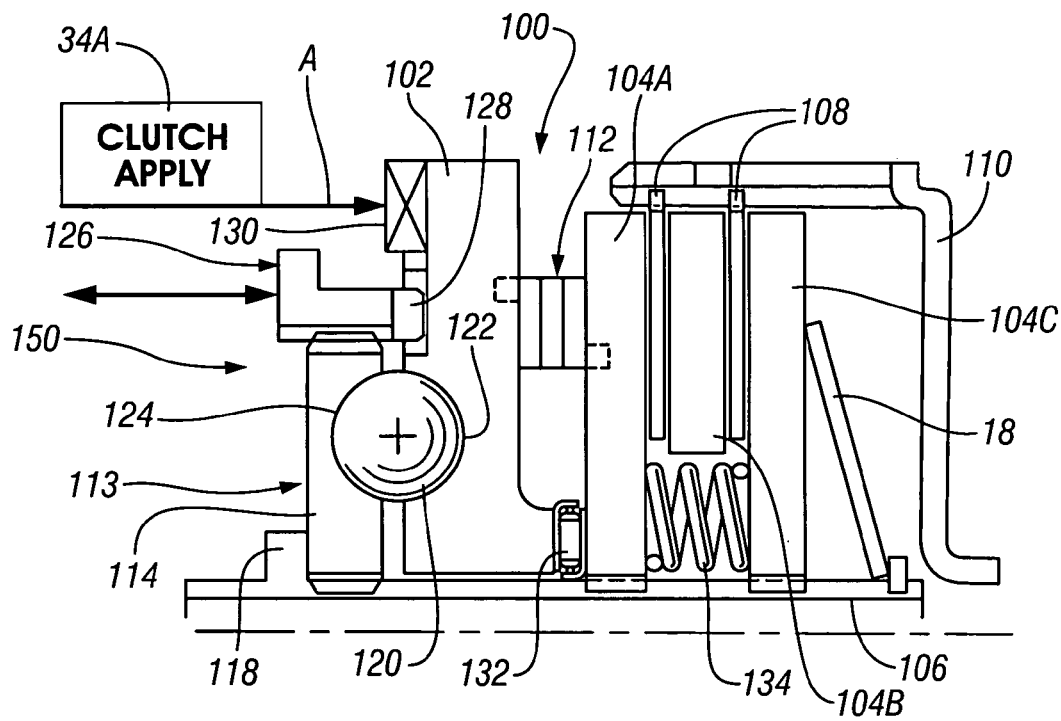
FIG. 3 is a view similar to FIG. 1 describing another embodiment of the present invention.

A partial view of a torque-transmitting mechanism 100 shown in FIG. 3 includes an apply plate 102, a plurality of plates 104 that are splined to a shaft 106, and a plurality of plates 108 that are splined to a transmission hub portion 110. The apply plate 102 is also a member of a torque-to-thrust apparatus 113, which includes a plate 114 drivingly connected with the shaft 106 and positioned thereon by a shoulder member 118, and a plurality of spheres or rollers 120 disposed in cam surfaces 122 and 124 formed on the apply plate 102 and the plate 114, respectively. A torsion spring 112 is disposed between the apply plate 102 and the plate 104A. This torsion spring 112 maintains contact between the spheres or rollers 120 and cam surfaces 122 and 124 as the apply plate 102 moves axially during engagement of the torque-transmitting mechanism. A mechanical clutch 126 is drivingly connected through a spline with the plate 114 and engageable with the apply plate 102 through a plurality of axially extending teeth 128.

The clutch apply mechanism 34A applies a force A through a thrust bearing 130 to cause the apply plate 102 to enforce frictional engagement between the plates 104 and 108 through a thrust bearing 132. As the frictional engagement between the plates 104 and 108 increases, the apply plate 102 will begin to rotate relative to the plate 114 due to the force from the torsion spring 112. When the torque-transmitting mechanism 100 is fully engaged, the mechanical clutch 126 can be engaged, thereby preventing relative rotation between the apply plate 102 and the plate 114. The clutch apply mechanism 34A is preferably similar in construction as the apply mechanism 34.

Figure 4:
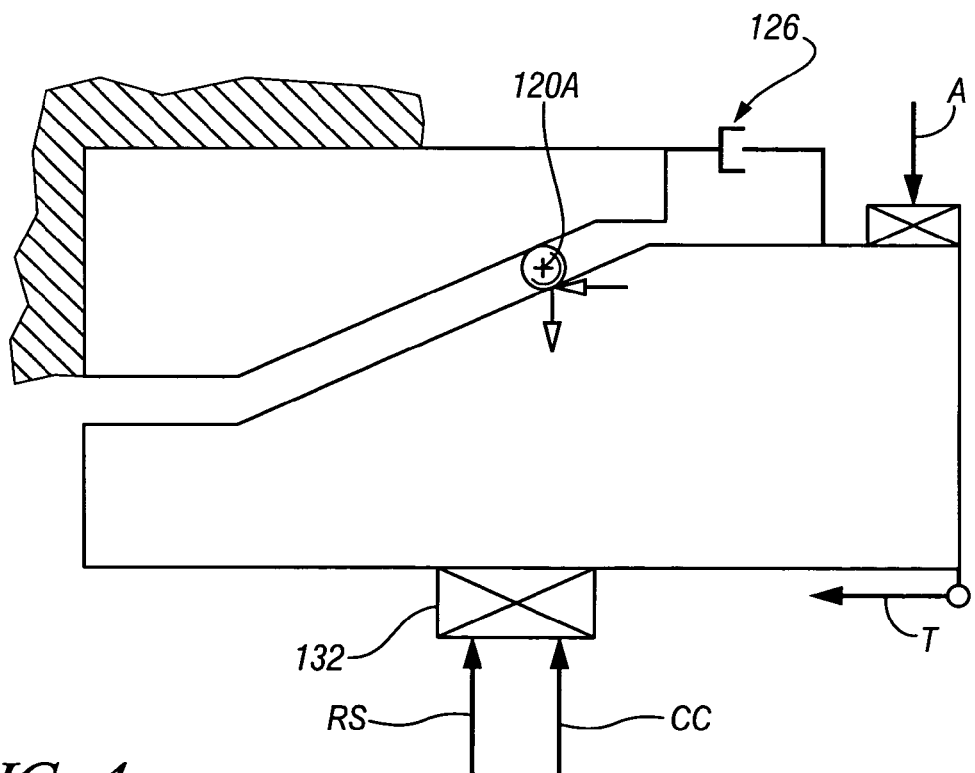
FIG. 4 is a view similar to FIG. 2 describing the operation of the embodiment shown in FIG. 3.

The diagrammatic representation in FIG. 4 provides a further example of the operation of the mechanism shown in FIG. 3. In FIG. 4, the force T of the torsion spring 112 replaces the force F of the friction in FIG. 1. Also in FIG. 3, a return spring 134 is disposed within the torque-transmitting mechanism between the plates 104A and 104C. The return spring force as well as the clutch compliance force RS and CC, respectively, operate through the thrust bearing 132 to resist the axial movement of the plate 102. As explained above, the mechanical clutch 126 is engaged after the torque-transmitting mechanism 100 has been fully applied.

The torque-transmitting mechanism 100 has a plate 104A, which is drivingly connected with the shaft 106 disposed adjacent the apply plate 102. This difference permits the torque-to-thrust apparatus 113 to operate in either direction of rotation for the hub 110. Whether the hub 110 rotates clockwise or counterclockwise is immaterial to the application of the torque-to-thrust apparatus 113 since the torsional spring 112 will maintain contact between the spheres or rollers 120 and cam surfaces 122 and 124.

When it is desired to release or disengage the torque-transmitting mechanism 100, the apply force A is again established, which unloads the forces on the mechanical clutch 126, thereby permitting release of the mechanical clutch 126. Followed by the release of the mechanical clutch 126, the apply load can be decreased in a controlled manner typical of torque-transmitting mechanisms.

Figure 5:
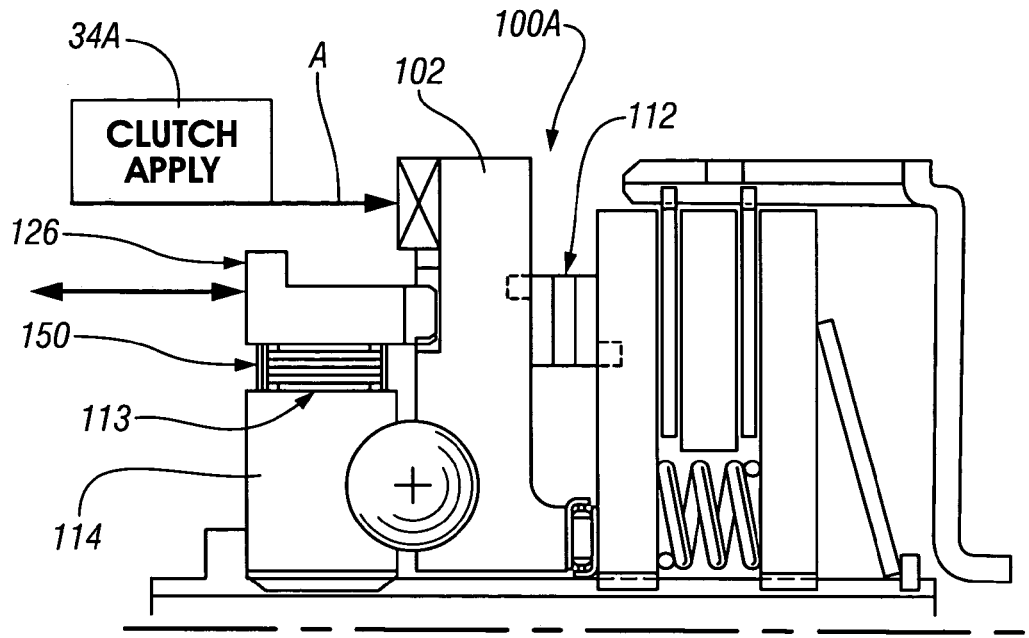
FIG. 5 is a view similar to FIG. 1 describing another embodiment of the present invention.
Figure 6:
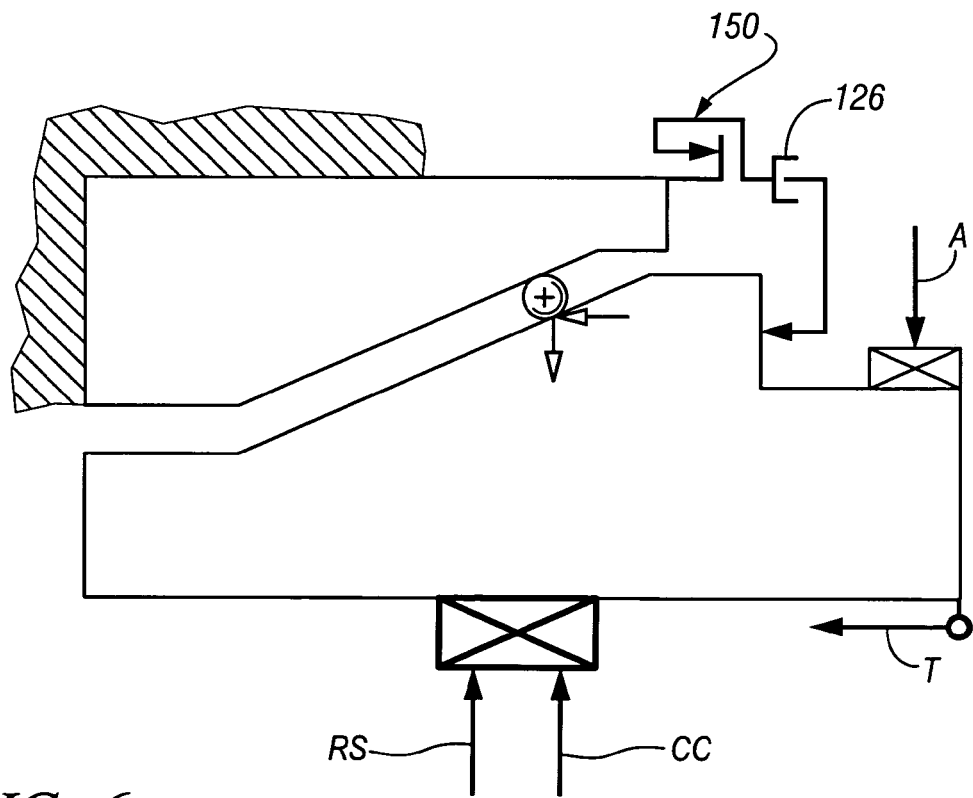
FIG. 6 is a view similar to FIG. 2, which further describes FIG. 5.

A partial view of torque-transmitting mechanism 100A, shown in FIGS. 5 and 6, is similar in construction and operation with the torque-transmitting mechanism 100 shown in FIG. 3. However, the torque-to-thrust apparatus 113 also includes a one-way torque-transmitting mechanism 150, which is disposed between the plate 114 and the mechanical clutch 126. The one-way torque-transmitting mechanism 150 allows for the mechanical clutch 126 to be engaged prior to application of the clutch apply force A.

When the apply force A is then established, relative rotation between the apply plate 102 and the plate 114 is permitted by the one-way torque-transmitting mechanism 150. The one-way torque-transmitting mechanism 150 prevents reverse rotation of the plate 114 relative to the apply plate 102 and will therefore retain the torque-transmitting mechanism 150 fully engaged and the apply force A can be released. The employment or use of the one-way torque-transmitting mechanism 150 allows apply force A to be elevated as required in the torque-transmitting mechanism 100 without disengagement of the mechanical clutch 126.

A partial view of a torque-transmitting mechanism 200, shown in FIG. 7, includes an apply plate 202, a plurality of friction discs 204 splined to a transmission hub 206, and a plurality of friction discs 208 splined to a transmission shaft 210. The apply plate 202 is also splined to the shaft 210. An annular ramp member 214 is splined to the shaft 210 and includes a ramp portion or surface 216, which is engaged by a plurality of rollers 218, which in turn engage an annular inner surface 220 formed on the apply plate 202. The rollers 218 are urged leftward, as seen in FIG. 7, by a spring pack 222, which is disposed in compression between a release member 224 and a retainer plate 226. The retainer plate 226 is positioned on the shaft 210 by a locking ring 228.

The rollers 218 are retained in a caged portion 230 of the release member 224. A force apply mechanism 232 is disposed to urge the rollers 218 and the member 224 rightward when desired. As seen in FIG. 8, the rollers 218 are a plurality of spheres disposed between the apply plate 202 and the ramp surface 216.

FIG. 9, which is an alternative embodiment of the mechanism shown in FIG. 8, has cylindrical rollers 218A disposed between a plurality of rectangular surfaces 220A formed on the plate 202 and a plurality of rectangular ramp surfaces 216A formed on the ramp member 214A. During disengagement of the torque-transmitting mechanism 200, the rollers are urged rightward to permit substantially relative rotation between the plates 204 and 208. When it is desired to engage the torque-transmitting mechanism 200, a force A is applied thereto by an apply mechanism 234, which may be in the form of a non-rotating piston and thrust bearing, or an electric motor drive with a torque-to-thrust apparatus and thrust bearing. Either of these devices will provide the desired apply force A.

When the apply force A moves the plate 202 rightward to establish frictional engagement between the plates 204 and 208 and therefore a drive connection between the shaft 210 and the hub 206, the rollers 218, 218A are urged by the spring 222 to remain in engagement between the ramp surface 216 and the inner surface 220 of the apply plate 202. When the torque-transmitting mechanism 200 is fully engaged, the apply force A can be released; however, the plate 202 cannot move leftward to disengage the torque-transmitting mechanism 200 because of the action of the rollers 218, 218A between the apply plate 202 and the ramp member 214.

When clutch disengagement is desired, the apply force A is reestablished and simultaneous with that the rollers 218 and the cage member 224 are urged rightward by the apply mechanism 232 to disestablish contact between the rollers 218 and either the ramp surface 216 or the surface 220. With the rollers thus disengaged, the apply force A can be released in a controlled manner, thereby permitting controlled release of the torque-transmitting mechanism 200. When the torque-transmitting mechanism 200 is fully disengaged, the force on the member 232 is released and the rollers 218 will return to their operating position shown in FIG. 7.

Each of the above-described apparatus has a latching mechanism in the form of a mechanical clutch and torque-to-thrust mechanism or one-way clutch that retains the engagement of the respective torque-transmitting mechanism. The latching apparatus is released when the torque-transmitting mechanism is to be disengaged by applying an engaging force to the torque-transmitting mechanism while releasing the latching apparatus and then releasing the engaging force. This permits the engaging force mechanism to be released while the torque-transmitting mechanism remains engaged during normal operation.

The invention claimed is:

1. A torque transmitting and latching apparatus comprising:
   a first rotatable member and a second rotatable member operatively connected by a selectively engageable torque-transmitting mechanism comprising at least first and second friction plates drivingly connected with said first and second rotatable members respectively;
   a torque to thrust apparatus comprising an input member operable to transmit an initial engagement force to said first friction plate, and a reaction member rotatable with said second friction plate;
   apply means operable on said torque to thrust input member to provide an initiating engagement force to said torque-transmitting mechanism independent of said reaction member of said torque to thrust apparatus;
   said torque to thrust apparatus being effective in response to said initiating engagement force to establish full engagement of said torque-transmitting mechanism; and
   said latching apparatus including a means for presenting an engagement between said torque to thrust input member and said torque to thrust reaction member to prevent disengagement of said torque-transmitting mechanism upon release of said initiating engagement force.

2. The torque transmitting and latching apparatus defined in claim 1 further comprising:
   said initiating engagement force being reapplied to permit disengagement of said torque-transmitting mechanism and release of said latching apparatus.

3. The torque transmitting and latching apparatus defined in claim 1 further comprising:
   said apply plate being a member of said torque to thrust mechanism; and
   said latching apparatus means including a mechanical toothed clutch engageable across said input member and said reaction member of torque to thrust apparatus.

4. The torque transmitting and latching apparatus defined in claim 1 further comprising:
   said apply plate being a member of said torque to thrust mechanism; and
   said latching apparatus means including one-way torque transmitting means engageable across said input member and said reaction member of torque to thrust apparatus.

5. The torque transmitting and latching apparatus defined in claim 1 further comprising:
   a resilient means operatively disposed between a member of said torque-transmitting mechanism and said input member of said torque to thrust apparatus to maintain a positioning force on said torque to thrust apparatus.

6. The torque transmitting and latching apparatus defined in claim 1 further comprising:
   said latching apparatus means including one-way thrust transmitting means to prevent retraction of the apply plate upon release of said engagement force.

* * * * *